(12) United States Patent
Praud et al.

(10) Patent No.: US 6,299,236 B1
(45) Date of Patent: Oct. 9, 2001

(54) INTERIOR LINING, AND DOOR FITTED THEREWITH, COMPRISING A MEANS FOR LIMITING THE DISPLACEMENT OF A WINDOW AT LEAST IN ONE DIRECTION

(75) Inventors: Jean-Pierre Praud, Auvers-sur-Oise (FR); Christophe Hesse, Olpe (DE); Laurent Arquevaux, Sully-sur-Loire; Philippe Delire, Beaumont-sur-Sarthe, both of (FR)

(73) Assignee: Meritor Light Vehicle Systems, Sully-sur-Loire (FR)

( * ) Notice: Subject to any disclaimer, the term of this patent is extended or adjusted under 35 U.S.C. 154(b) by 0 days.

(21) Appl. No.: 09/497,406

(22) Filed: Feb. 3, 2000

(30) Foreign Application Priority Data

Feb. 12, 1999 (FR) .................................................. 99 01746

(51) Int. Cl.[7] ................................ B60J 1/16; E05D 13/00
(52) U.S. Cl. .................................... 296/146.7; 296/146.2; 49/374; 49/415; 49/502
(58) Field of Search .............................. 49/374, 414, 415, 49/502; 296/146.2, 146.7

(56) References Cited

U.S. PATENT DOCUMENTS

| | | | |
|---|---|---|---|
| 1,621,507 | * | 3/1927 | Holt ........................................ 49/415 |
| 1,962,809 | * | 6/1934 | Conway ................................... 49/414 |
| 2,426,474 | * | 8/1947 | Trammell, Sr. et al. .............. 49/415 |
| 2,775,796 | * | 1/1957 | Passis ..................................... 49/415 |
| 4,658,546 | * | 4/1987 | Moriyama .............................. 49/374 |
| 4,669,221 | | 6/1987 | Ugawa et al. . |
| 4,956,942 | * | 9/1990 | Lisak et al. ............................ 49/502 |
| 5,113,602 | * | 5/1992 | Guillaume et al. .................... 49/502 |
| 5,771,637 | * | 6/1998 | Oikawa et al. ........................ 49/414 |
| 5,943,823 | * | 8/1999 | Yoshida et al. ........................ 49/414 |

FOREIGN PATENT DOCUMENTS

| | | |
|---|---|---|
| 19629264 | 1/1997 | (DE) . |
| 302725 | 2/1989 | (EP) . |
| 2728008 | 6/1996 | (FR) . |
| 2303663 | 2/1997 | (GB) . |
| 8108743 | 4/1996 | (JP) . |
| 10317797 | 12/1998 | (JP) . |

* cited by examiner

*Primary Examiner*—Joseph D. Pape
*Assistant Examiner*—Hilary Gutman
(74) *Attorney, Agent, or Firm*—Rothwell, Figg, Ernst & Manbeck

(57) ABSTRACT

The invention relates to an interior lining for a car door, the lining being fitted with a carrier panel which is integral with the lining and to which is fixed a window lifting mechanism which is fitted with a window mounted on a support, the lining being fitted with at least one stop means to limit the lateral displacement of the window in a substantially horizontal direction, the stop means having a free end and an opposing end which is connected to the carrier panel. The invention is characterized in that the stop means has, at least without any strain applied thereto by the window, a naturally curved shape which comprises a contact region with the window, which contact region is arranged with spacing from the free end of the stop means, the stop means further being capable of being deformed in a resilient manner in contact with the window in order to push away the window by exerting a restoring force directed in a direction which is substantially perpendicular to the direction of displacement of the window.

8 Claims, 3 Drawing Sheets

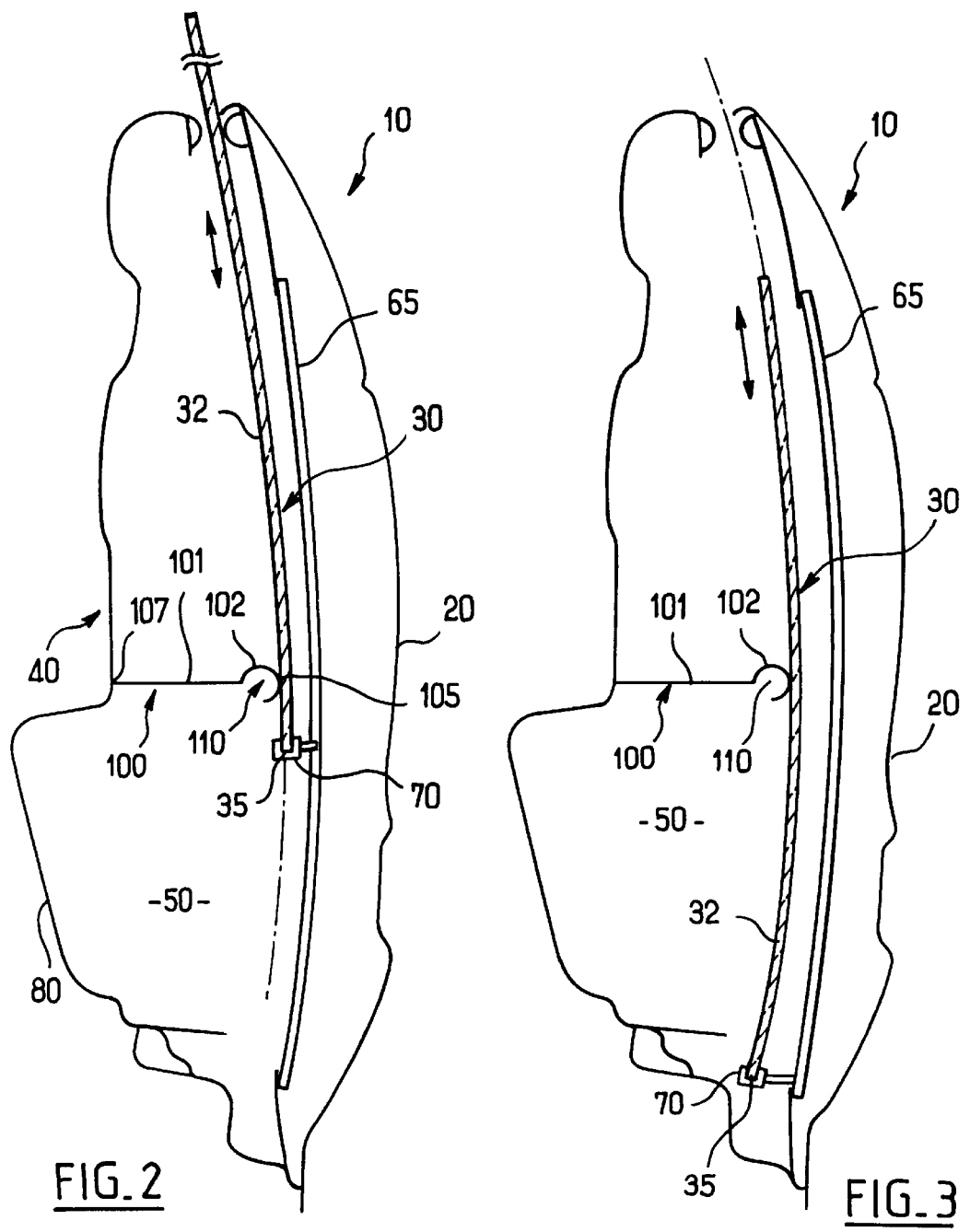

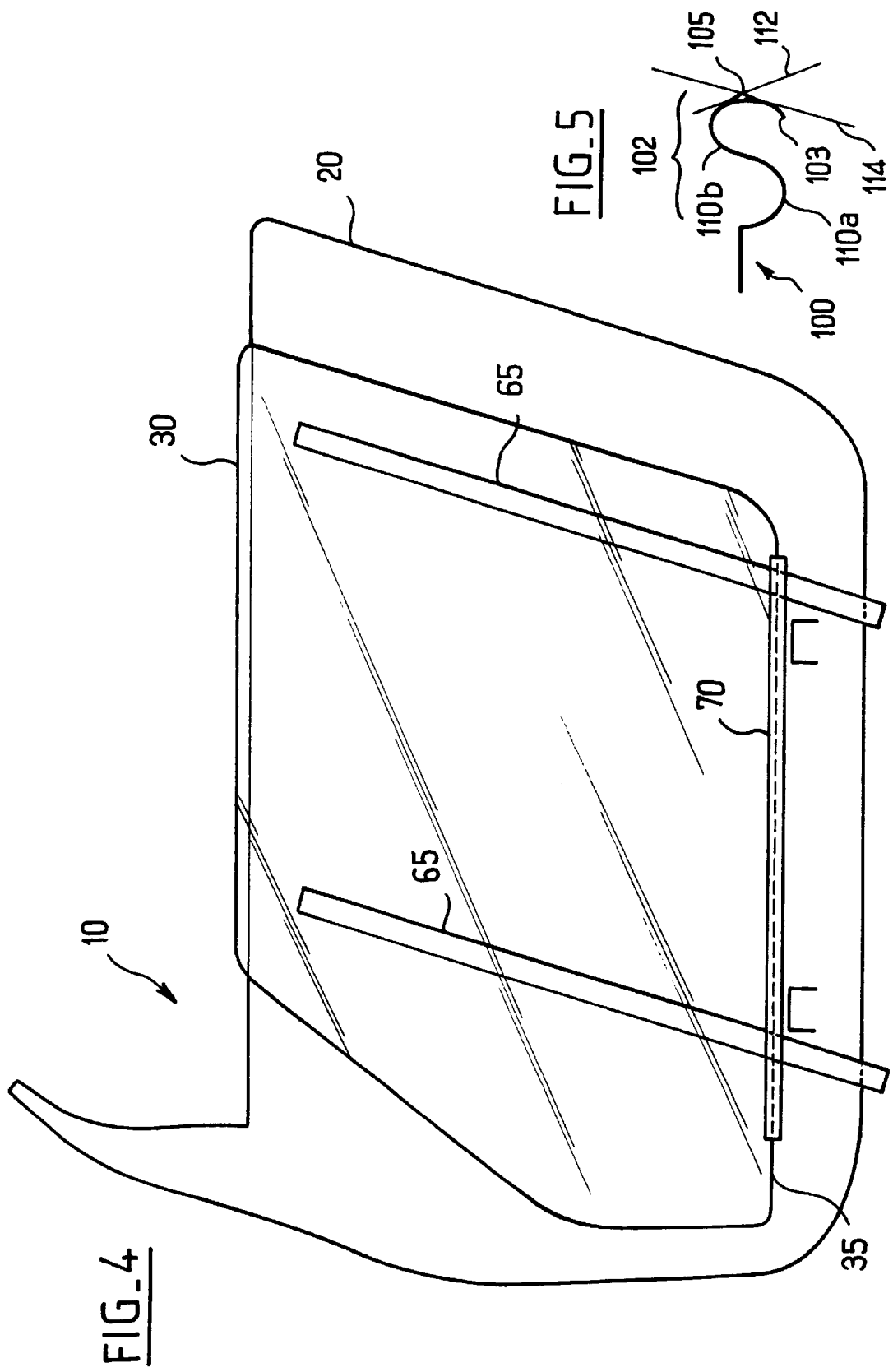

INTERIOR LINING, AND DOOR FITTED THEREWITH, COMPRISING A MEANS FOR LIMITING THE DISPLACEMENT OF A WINDOW AT LEAST IN ONE DIRECTION

FIELD OF THE INVENTION

The scope of the invention is that of interior fittings for motor vehicles and, in particular, those associated with car doors.

BACKGROUND OF THE INVENTION

There already exist motor vehicle doors which comprise:
an exterior door panel, typically of sheet metal,
an interior door lining which is fitted to the exterior panel and which covers it at least partially, the panel and the lining together defining, at least locally, a hollow internal space, the lining comprising a carrier panel of rigid plastics material, and
a window, connected to at least one window lifting mechanism which comprises at least one means of support of the window in the region of a lower edge thereof and which is itself fixed to the exterior panel and/or the interior lining, so that the window can be displaced substantially vertically between a first upper position and a second lower position, in which it extends inside the internal space of the door.

With regard to those components, it became apparent that there were problems of stability and poor positioning or displacement of the window inside the door, in particular when the window is slightly curved (as is very often the case at present) and when it is at least partially lowered inside the hollow internal space of the door.

That can, in particular, result in a malfunction of the window or in damage thereto, in particular owing to significant vibrations, which the vehicle (and therefore the window) can undergo, or when the door is closed (whether slammed or not) with its window partially or totally lowered.

SUMMARY OF THE INVENTION

The invention proposes to solve that problem at little cost and with good reliability. To that end, the invention relates to an interior lining for a motor vehicle door, the lining comprising:
a carrier panel of rigid plastics material which is integral with the lining and to which is fixed a window lifting mechanism which is fitted with a window and which comprises a support means for that window which is movable between a first upper position and a second lower position for the displacement of the window,
at least one resilient stop means to limit the lateral displacement of the window in a substantially horizontal direction, the stop means having a free end, and an opposing end which is connected to the carrier panel, wherein the stop means has an open and naturally curved portion which has a contact region with the window, which contact region is arranged with spacing (away) from the free end of the stop means.

"Naturally curved portion" is intended to signify the fact that the shape of that portion is rounded or rolled without any force being applied thereto, in particular a supporting force from the glass on the stop means.

Furthermore, since the stop means is in constant contact with the window, it is adapted to be deformed in a resilient manner and to push away the window by exerting a restoring force which opposes the lateral movements of the window, and this in a direction which is substantially perpendicular to the normal direction of displacement of the window (raising and/or lowering).

In order to limit to the greatest possible extent the lateral movements of the window inside the hollow internal space of the door, and to allow a good guiding of the window, whatever its position inside that space, the resilient stop means can comprise a rigid rod which terminates, at the free end of the stop means, in a resiliently deformable portion which has an open curved portion which is in the shape of a hook, against which the surface of the window presses, that curved shape having, in the region of its contact region with the window, inverted inclines for guiding the window substantially according to the two, lowering and raising, movements thereof In accordance with an alternative, the resilient stop means can comprise a rigid rod which terminates, at the free end of the stop means, in a resiliently deformable portion which has two successive inverted inflexions, giving it substantially the shape of a flattened "S".

According to a complementary aspect, the carrier panel preferably incorporates the resilient stop means which is then in the form of a rib, with which it is moulded as one component.

The invention also relates to a motor vehicle door comprising:
an exterior door panel, typically of sheet metal,
an interior door lining which is fitted to the exterior panel and which covers it at least partially, the exterior panel and the interior lining together defining, at least locally, a hollow internal space, the lining comprising a carrier panel of rigid plastics material, and
a window which is connected to a window lifting mechanism which comprises a support means for the window in the region of a lower edge thereof and which is itself fixed to the exterior panel and/or to the interior lining, so that the window can be displaced substantially vertically between a first upper position and a second lower position, in which it extends inside the internal space of the door,
the carrier panel being fitted, at an intermediate level, with at least one resilient stop means which cooperates with the window to limit the lateral displacement thereof in a substantially horizontal direction, the stop means having a free end and an opposite end which is connected to the carrier panel,
wherein the stop means has an open, naturally curved portion which has a contact region with the window, which contact region is arranged with spacing from the free end of the stop means.

BRIEF DESCRIPTION OF THE DRAWINGS

The invention and its implementation will be appreciated even more clearly with the aid of the following description, given with reference to the drawings, in which FIG. 2 is a sectional view of the door from FIG. 1, with the window in the upper position, FIG. 3 is a sectional view identical to that in FIG. 2, but with the window in the completely lowered position, FIG. 4 is a front view of an element of the door from FIGS. 2 and 3, and FIG. 5 is a detailed view of FIGS. 2 and 3.

DETAILED DESCRIPTION OF THE PREFERRED EMBODIMENTS

Figure 1:
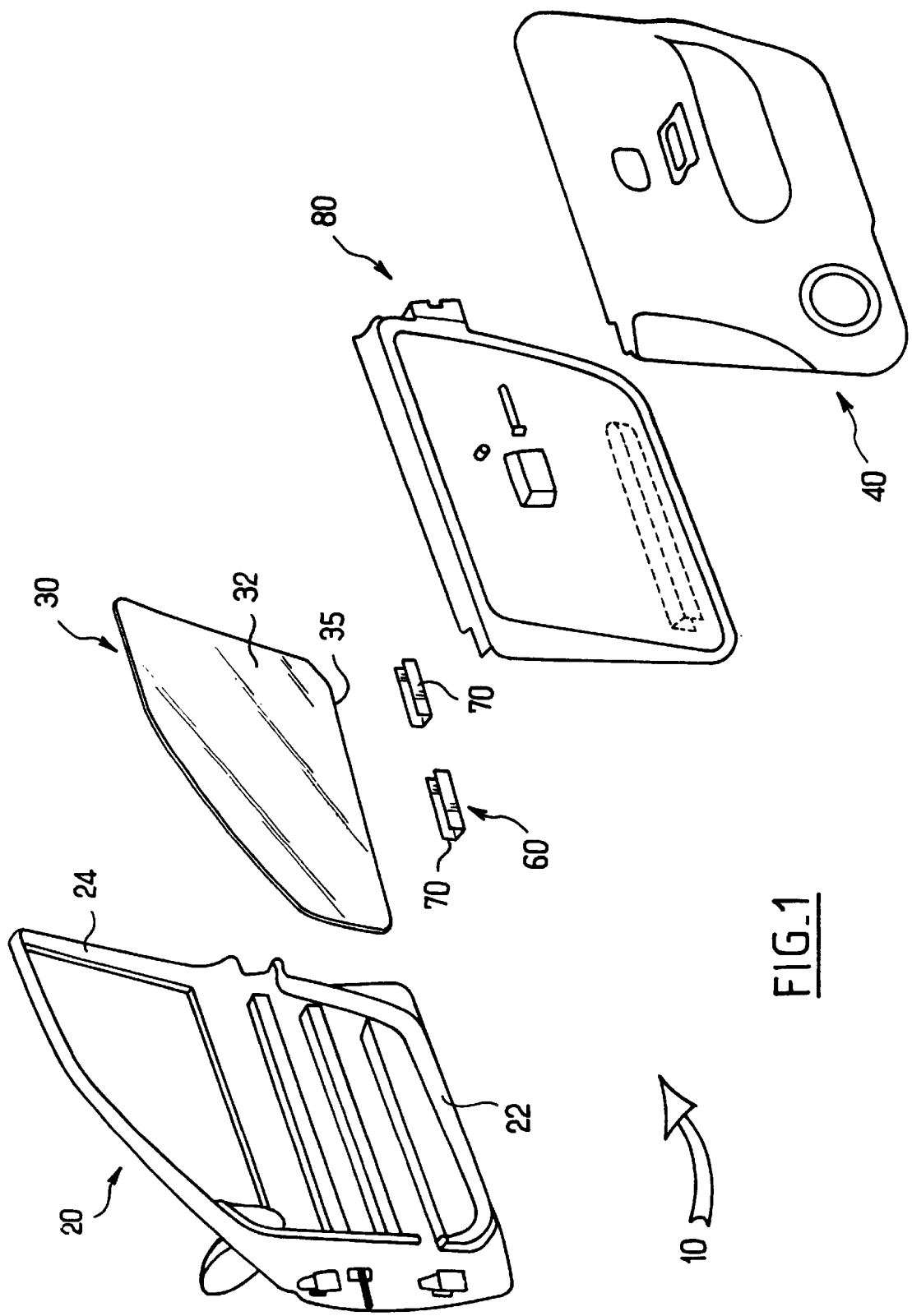
FIG. 1 is an exploded view of a vehicle door.

Therefore, FIG. 1 illustrates a conventional assembly of a vehicle door having the reference numeral 10.

That assembly comprises an exterior panel 20, in that case of sheet metal (but also capable of being of a plastics or composite material), divided into a lower portion 22 (known as the belt) and an upper portion 24 which is used to surround a window 30 typically of glass.

An interior lining 40 (also known as the cladding or moulding) covers, at least partially, that exterior panel 20 on the inside of the vehicle passenger space, in particular in the region of the lower portion 22 of the door 10. If necessary, the uprights of the upper portion 24 could also be lined. That lining 40 has a decorative and sealing function. It is also used to mask and/or receive various elements or mechanical or electrical functional fittings of the vehicle (speakers, lock, door handle, window lifting apparatus, window guide, electrical circuitry, various sealing joints, etc.).

Conventionally, that interior lining 40 is fitted to the exterior panel 20 by resiliently deformable components (not illustrated), such as studs (also known as clips), arranged in particular around the periphery of the lining 40, the inner face of the exterior panel 20 having complementary apertures (not illustrated) intended to receive them. Such an assembly can be movable in order to allow the interior lining to be removed from the exterior door panel.

In the region of the lower portion 22, the lining 40 and the exterior panel 20 together define a hollow internal space 50 (see FIGS. 2 and 3) which is intended in particular to receive the functional elements and fittings previously referred to and in particular a window lifting mechanism 60 which comprises, for example, two vertical slides 65 (see FIGS. 2 to 4) for the substantially vertical displacement of the window 30, the window 30 being held, in the region of a lower edge 35, by at least one support means 70 which slides (either by means of an electric motor or by means of a handle) in the slides 65. Typically, as can be seen in FIG. 1, two support means 70, which are U-shaped in section, clamp the lower edge 35 of the window 30 and cooperate with the two slides 65. As an alternative, the support means 70 can extend over the majority of the lower edge 35 of the window and cooperate with two slides 65 (see FIG. 4). It is also possible to envisage a short support means 70 which is arranged in the center of the lower edge 35 of the window and which cooperates with a single central slide.

The interior lining 40 also has a carrier panel 80 which is independent thereof and which is produced in particular by an injection moulding technique in a rigid plastics material, such as polypropylene or another thermoplastics material.

As can be seen in FIGS. 2 and 3, the carrier panel incorporates a rib or stop means 100 which is intended to absorb any inadvertent lateral movements (to the right/left in the horizontal plane) of the window. Thus, that rib 100 is positioned in the upper half and, preferably, the upper third of the carrier panel 80, in the space 50 located between the lining 40 and the window 30.

Since the window 30 does not always have a perfectly rectilinear displacement, in particular if it is curved (as is very often the case today), the lateral rib 100 must, of course, be correctly positioned so that it is constantly in contact with the surface 32 of the window 30 in all of the positions of the window 30, and in particular when it is partially or completely lowered inside the hollow internal space 50 of the door.

To that end, the rib 100, which is preferably moulded as one component with the carrier panel, has a natural curved shape or portion 110 (unlike bristles used in the prior art), that is, without any strain caused by contact with the window 30. That curved (or rolled) shape 110 has a contact region 105 with the surface 32 of the window 30 which is arranged with spacing from a free end 103 of the rib in order to avoid any occurrence of the window "chattering" against the stop means during raising and lowering movements thereof.

The rib 100, and more specifically its curved shape 110, is similarly adapted to be able to be resiliently deformed in a substantially perpendicular direction relative to the raising and lowering movements of the window in order to push away the window by exerting a substantially horizontal resilient restoring force in order to ensure a guiding and a stabilization of the window according to its axis of normal displacement.

In particular, as can be seen in FIGS. 2 and 3, the rib 100 comprises a rigid rod 101 which is substantially horizontal and a resiliently deformable portion 102 which has a curved shape 110 which is open at the bottom and which is substantially "C"-shaped or hook-shaped and terminates at the free end 103 of the rib 100 opposite a fixed end 107. In the region of the contact region 105 with the surface 32 of the window 30, that curved shape 110 has inverted inclines 112 and 114 (see FIG. 5) so that the guiding of the window during raising and lowering movements thereof is smoothly carried out without any jerkiness.

As can also be seen in the variant in FIG. 5, the resiliently deformable portion 102 has two successive inverted inflexions 110a/110b which give it substantially the shape of a flattened "S". The resilient restoring force which pushes away the window is thus distributed over the two inflexions 100a and 110b, which results in better contact with the window because that force is neither too great nor too small. The contact between the window and the rib 100 is always effected by means of the curved shape 110 with gentle shapes owing to the inverted guiding inclines 112/114 in the region of the contact region 105.

The curved shape 110 can be fitted with a non-slip (and possibly also absorbent) runner in the region of the contact point in order to avoid scratching the window, such as, for example, a strip of felt.

In the two cases illustrated, the problems of lateral stability of the window are overcome by the rib 100 which reacts to the inadvertent movements of the window by clamping the window in a constant manner and by exerting a restoring force which pushes away the window.

Of course, the invention is in no way limited to the different preferential embodiments illustrated by way of example.

Thus, the carrier panel 80 can form merely an insert incorporated in the interior lining 40. In all cases, the rib 100 is, of course, formed integrally with the carrier panel 80 and is arranged inside the hollow internal space 50 of the door 10.

The curved shape 110 of the resiliently deformable portion 102 of the rib 100 can be freely modified during the manufacture of the panel 80 since it allows a resilient pressing action against the window 30 and does not hinder the natural displacements thereof from an upper to a lower position. For example, it is possible to select a rounded and flattened "W"-shape (a sort of 3) with, if necessary, a rod 101 which is substantially concertina-shaped, a heart shape with two C's in opposition or any other soft shape having an inversion of the incline in the region of the point of contact with the window.

What is claimed is:

1. An interior lining for a motor vehicle door, the lining comprising:

a carrier panel of a rigid plastics material which is integral with the lining and to which is fixed a window lifting assembly which is fitted with a window and which comprises a means for carrying the window which is movable between a first upper position and a second lower position for a displacement of the window, at least one resilient cantilever stop means adapted to limit a lateral displacement of the window in a substantially horizontal direction, the resilient cantilever stop means having a proximal end connected to an intermediary position in the carrier panel, a distal end with an open curved portion which has a contact region with the window, and a rigid rod that connects the distal and proximal ends.

2. The interior lining according to claim 1, wherein the resilient cantilever stop means terminates, at the distal end of the stop means, in a resiliently deformable portion of the open curved portion which is in the shape of a hook, against which a surface of the window presses, the open curved portion having, in the contact region with the window, inverted inclines for guiding the window substantially according to the upper and lower positions thereof.

3. The interior lining according to claim 1, wherein the resilient stop means terminates, at the distal end of the resilient cantilever stop means, in a resiliently deformable portion which has two successive inverted inflexions, giving the resiliently deformable portion substantially the shape of a flattened S.

4. The interior lining according to claim 1, wherein the resilient cantilever stop means is a rib, with which the carrier panel is molded as one component.

5. A motor vehicle door comprising:

an exterior panel of the door, typically of sheet metal, an interior lining of the door which is fitted to the exterior panel and which covers the exterior panel at least partially, the exterior panel and the interior lining together defining, at least locally, a hollow internal space, the lining comprising a carrier panel of rigid plastics material, and a window which is connected to a window lifting assembly which comprises a means for carrying the window in a region of a lower edge thereof and which is fixed to the exterior panel or to the interior lining, so that the window can be displaced substantially vertically between a first upper position and a second lower position in which the window extends inside the internal space of the door, the carrier panel being fitted, at an intermediate level, with at least one resilient cantilever stop means which cooperates with the window to limit a lateral displacement thereof in a substantially horizontal direction, the resilient cantilever stop means having a proximal end connected to the intermediate level in the carrier panel, a distal end with an open curved portion which has a contact region with the window, and a rigid rod that connects the distal and proximal ends.

6. The door according to claim 5, characterized in that the resilient cantilever stop means terminates, at the distal end of the resilient cantilever stop means, in a resiliently deformable portion of the open curved portion which is in the shape of a hook, against which a surface of the window presses, the curved portion having, in the contact region with the window, inverted inclines for guiding the window substantially according to the upper and lower positions thereof.

7. The door according to claim 5, wherein the resilient cantilever stop means terminates, at the distal end of the resilient cantilever stop means, in a resiliently deformable portion which has two successive inverted inflexions, giving the deformable portion substantially the shape of a flattened S.

8. The door according to claim 5, wherein the stop means is a rib which is molded as one component with the carrier panel and which protrudes therefrom in the direction of the window.

* * * * *